(12) United States Patent
Reichwein et al.

(10) Patent No.: US 7,261,947 B2
(45) Date of Patent: Aug. 28, 2007

(54) PLYWOOD LAMINATE HAVING IMPROVED DIMENSIONAL STABILITY AND RESISTANCE TO WARPING AND DELAMINATION

(75) Inventors: David P. Reichwein, Elizabethtown, PA (US); Moon Gi Kim, Starkville, MS (US); Fang Qiao, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 53 days.

(21) Appl. No.: 10/727,749

(22) Filed: Dec. 4, 2003

(65) Prior Publication Data

US 2005/0123728 A1 Jun. 9, 2005

(51) Int. Cl.
*B32B 5/06* (2006.01)

(52) U.S. Cl. .............. 428/537.1; 428/535; 428/528; 52/748.1

(58) Field of Classification Search ........... 428/528, 428/535, 537.1; 52/748.1
See application file for complete search history.

(56) References Cited

U.S. PATENT DOCUMENTS

| | | | | |
|---|---|---|---|---|
| 4,361,612 A | * | 11/1982 | Shaner et al. | 428/106 |
| 5,040,582 A | * | 8/1991 | Hsu | 144/348 |
| 5,234,747 A | * | 8/1993 | Walser et al. | 428/215 |
| 5,643,983 A | * | 7/1997 | Lee | 524/267 |
| 5,968,625 A | * | 10/1999 | Hudson | 428/54 |
| 5,989,668 A | | 11/1999 | Nelson et al. | 428/50 |
| 6,006,486 A | * | 12/1999 | Moriau et al. | 52/589.1 |
| 6,023,907 A | * | 2/2000 | Pervan | 52/748.1 |
| 2003/0233809 A1 | | 12/2003 | Pervan | |
| 2004/0016196 A1 | | 1/2004 | Pervan | |

OTHER PUBLICATIONS

ANSI/HPVA HP-1-2000, American National Standard for Hardwood and Decorative Plywood.

* cited by examiner

*Primary Examiner*—Leszek Kiliman (57) ABSTRACT

A plywood laminate having dimensional stability and resistance to warping and delamination is formed from a plurality of higher quality plies and a plurality of lower quality plies. The higher quality plies may be of hardwood and the lower quality plies may be of softwood or lower quality hardwoods, or the higher quality plies may have a veneer grade of better than ANSI/HPVA HP-1-2000 veneer grade C and the lower quality plies may have a veneer grade of no greater than ANSI/HPVA HP-1-2000 veneer grade C. The exposed plies are of the higher quality. In most embodiments, at least two adjacent interior plies are of the lower quality. In those embodiments having a tongue and groove or click-lock edge configuration, the tongue comprises portions of at least two plies and at least one of the plies is a higher quality ply.

64 Claims, 1 Drawing Sheet

PLYWOOD LAMINATE HAVING IMPROVED DIMENSIONAL STABILITY AND RESISTANCE TO WARPING AND DELAMINATION

TECHNICAL FIELD

The present invention is related to plywood structures comprising a plurality of wood veneer plies and decorative plywood laminates, and particularly to plywood laminates and decorative laminates having improved dimensional stability and resistance to warping and delamination. Further, the invention is directed to such decorative laminates having a click-lock or tongue and groove edge configuration.

BACKGROUND OF THE INVENTION

Plywood structures are well known in the art. They are composed of layers or plies of wood veneer with adjacent plies bonded with an adhesive. Decorative plywood laminates include a decorative ply adhered to a plywood substrate. The ply of the substrate opposite or distal the decorative ply is known as the back ply. One of the limitations of the prior art plywood is its relatively poor dimensional stability, which results in warping and cracking.

Those skilled in the art have tried to improve the dimensional stability of plywood by various means. Most commonly the direction of the grain of adjacent plies have been aligned substantially perpendicular to each other. The plies having grain perpendicular to the grain of the decorative ply being crossband plies. Typically, the grain of the decorative veneer or ply is parallel to the lengthwise edge of the veneer.

Improved dimensional stability can be obtained by increasing the number of plies or decreasing the thickness of the plies. For a given desired thickness, the thinner the plies, the more plies comprise the plywood and the stronger and more stable the plywood.

Most plywood is made using the same species of wood. However, Hsu U.S. Pat. No. 5,040,582 discloses a multi species laminated veneer lumber (a specialty plywood used for lumber manufacture), as well as laminated veneer lumber made from the combination of hardwoods and softwoods. Hsu notes the difference in shrinkage and expansion between the different wood species, particularly between high and low density wood species. He teaches that the species sequence from face to core must be identical or very similar on either side of the center ply when an odd number of plies are used or on either side of the center line when an even number of plies are used.

Walser et al. U.S. Pat. No. 5,234,747 teaches a symmetrical lay-up of, from top to bottom, multiple plies of a low density, 6% to 15% moisture content spruce, multiple plies of a high density, less than 5% moisture content Douglas fir, and multiple plies of a low density, 6% to 15% moisture content spruce.

Polymer laminates comprising phenolic resin-impregnated paper, such as taught in Nelson et al. U.S. Pat. No. 5,989,668 have a dimensional stability superior to that of plywood. The dimensional stability of the resin-impregnated laminates permit the use of click-lock edge structures such as disclosed in Pervan U.S. Pat. No. 6,023,907 and Morian et al. U.S. Pat. No. 6,006,486.

As such, a need exists for a plywood laminate having improved stability and resistance to warping and delamination, particularly one that uses less expensive wood plies. Such a plywood laminate would permit the use of click-lock edge structures.

SUMMARY OF THE INVENTION

It is therefore, an object of the present invention to provide a plywood laminate including higher quality wood plies, lower quality wood plies, and an adhesive. The higher quality wood plies may be better than ANSI/HPVA HP-1-2000 veneer grade C and the lower quality plies may be no greater than ANSI/HPVA HP-1-2000 veneer grade C. The higher quality wood plies may be a hardwood and the lower quality plies may be a lower quality hardwood or a softwood.

It is also an object of the present invention to provide a plywood laminate having plies of at least two different qualities in which the effects of the anisotropic nature of wood is minimized in the laminate while lay-up of the plies is structurally asymmetrical.

It is a further object of the present invention to provide a plywood laminate in which the plies may have different thicknesses.

It is another object of the present invention to provide a plywood laminate in which the moisture content is controlled to improve dimensional stability. The moisture content may be controlled between 6% and 8%.

A still further object of the present invention to provide a decorative plywood laminate including a decorative ply and the plywood laminate of the present invention.

Yet another object of the present invention to provide a decorative plywood laminate having a click-lock edge configuration, particularly in which at least one adhesive layer is interposed between the upper surface and the lower surface of the tongue. This permits the use of the decorative plywood laminates in a floating floor, in which the segmented floor pieces are not glued to the subfloor.

DETAILED DESCRIPTION OF THE INVENTION

Segmented floors with click-lock edge configurations are currently manufactured only using non-wood or polymer resin-impregnated laminates or similar structural substrates since the click-lock system requires substrates with good strength and minimal anisotropic differences, which yield good dimensional stability. Good dimensional stability is of increased importance in segmented floors that are installed without adhesively bonding the floor to the subfloor. Segmented plywood floors of the prior art, which have tongue and groove edge configurations and float on the subfloor, expand and contract under varying humidity conditions, causing warping of the segmented pieces. Any warping of the segmented pieces can appear as raised spots in the floor.

Wood materials are preferred in general as flooring substrates over the polymer resin-impregnated laminates, but have lower strength and dimensional stability. Due to the anisotropic nature of wood, plywood structures have been considered unsuitable in manufacturing segmented floors with the click-lock edge configuration. Such edge configurations require intricate cutting and the anisotropic properties of the wood tend to cause the tongues to break during use.

The plywood structure of the present invention has sufficient strength and dimensional stability for the click-lock edge configuration to be efficiently manufactured and used. The resultant segmented pieces also have sufficient dimensional stability and mechanical performance properties to deter warping and delamination.

The present inventors have developed a plywood laminate that has sufficient strength and dimensional stability to permit click-lock edge configurations while minimizing the number of higher quality plies, thereby minimizing the cost of the decorative plywood laminate. The decorative plywood laminate 1 of the present invention comprise a decorative ply 2, such as oak or other hardwood, and a plywood laminate substrate 3. The plywood laminate substrate 3 comprises at least two pluralities of plies 4 and 5. Plies 4 are of quality higher than the quality of plies 5. The plies are adhered together with an adhesive, which forms an adhesive layer 7 interposed between the plies.

For example, plies 4 may be a hardwood species and plies 5 may be a softwood or lower quality hardwood species. In another embodiment, plies 4 have a veneer grade of greater than ANSI/HPVA HP-1-2000 veneer grade C and the plurality of lower grade plies have a veneer grade of no greater than ANSI/HPVA HP-1-2000 veneer grade C.

Figure 1:
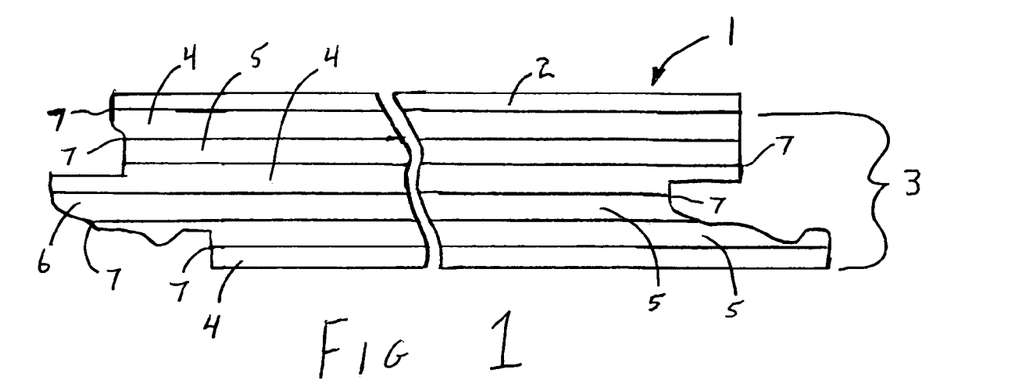
FIG. 1 is cross-sectional view of a first embodiment of the invention with portions removed to more clearly show the features of the invention.

As shown in FIG. 1, in one embodiment a higher quality ply 4 is adjacent the decorative ply 2. The third ply from the decorative ply and the bottom ply, which is distal the decorative ply, are also higher quality plies 4. In the embodiment shown in FIG. 2, the higher quality plies 4 are adjacent the decorative ply 2, fourth ply from the decorative ply and the bottom ply, which is distal the decorative ply.

As in prior art plywood laminates, the dimensional stability is improved by having the grain of adjacent plies perpendicular to each other. In the present invention, if there is an even number of plies in the substrate, the ply adjacent the decorative ply is a crossband ply having its grain perpendicular to the grain of the decorative ply, and the bottom, or distal, ply has a grain parallel to the grain of the decorative ply. In this embodiment, the grains of adjacent plies are perpendicular as in the prior art. However, if there is an odd number of plies in the substrate, the ply adjacent the decorative ply should have its grain perpendicular to the grain of the decorative ply, and the bottom, or distal, ply has a grain parallel to the grain of the decorative ply. Therefore, two adjacent inner plies have grain in the same direction.

Figure 2:
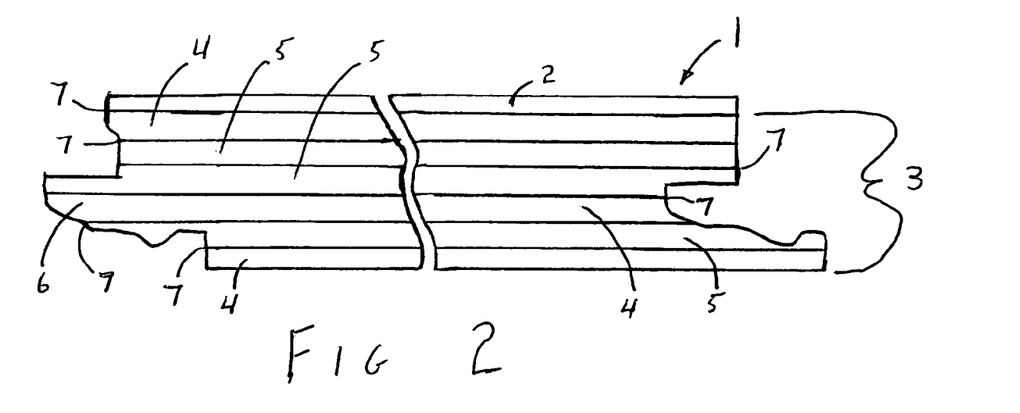
FIG. 2 is cross-sectional view of a second embodiment of the invention with portions removed to more clearly show the features of the invention.

In a one embodiment, the top and bottom plies of the substrate are chosen from the plurality of higher quality plies. At least two adjacent interior plies are chosen from the plurality of lower quality plies. If there are an even number of plies in the substrate and since the grain of adjacent plies are perpendicular to each other, the grain of the adjacent lower quality plies, such as shown in the figures, are perpendicular to each other. Further, the plurality of higher quality plies typically have at least one ply with grain parallel to the grain of the decorative ply and at least one ply with grain perpendicular to the grain of the decorative ply.

While not limited to decorative plywood laminates having a tongue and groove, or click-lock edge configuration, the present invention has certain advantages in such structures. By using lower quality plies, the overall cost of the laminate is reduced, however adequate dimensional stability and resistance to warping is obtained. Furthermore, to ensure adequate strength of the tongue, at least one of the plies forming the tongue is chosen from the plurality of higher quality plies. As shown in FIGS. 1 and 2, if either the third or fourth ply from the bottom of the substrate is a higher quality ply, the tongue 6 comprises a higher quality ply.

It is also noted, by choosing the proper thickness of the plies, the tongue comprises portions of at least two plies. Again, since the grains of adjacent plies are perpendicular to each other, the strength of the tongue is increased. Further, the horizontal surfaces of the edge configurations do not coincide with the adhesive layer between the plies. Since the adhesive layer is intact, the two perpendicular layers in the tongue minimize the amount of chipping and checking.

The invention is not limited to a substrate having 6 plies or even a substrate having an even number of plies. There should be at least 4 plies forming the laminate substrate. The maximum number is limited by economics. However, the greater the number of plies per given thickness, the greater is the strength and stability, and the anisotropic nature of the wood is minimized.

Since the decorative ply is a higher quality ply, if the ply of the substrate adjacent the decorative ply is a higher quality ply, it can be of a quality less than the quality of the other higher quality plies in the substrate. For example, the ply adjacent to decorative ply can have a veneer grade of ANSI/HPVA HP-1-2000 veneer grade C+, while the remaining higher quality plies can have a veneer grade of ANSI/HPVA HP-1-2000 veneer grade B or greater.

In some embodiments, the higher quality and lower quality plies are hardwoods selected from Shorea spp., and more particularly Meranti or Lauan. These hardwoods are relative inexpensive and the grain of the Meranti wood is straighter than many hardwoods, thereby lowering the tendency of warping. The density of the wood is preferably between about 400 and about 600 kg/m$^3$.

The adhesive should be an exterior grade, high quality structural adhesive. These adhesives, once cured, are water resistant and not permeable to moisture. The thickness of the adhesive layer between the plies is typically a minimum of 6 mils. In some embodiments the adhesive is phenol resin or amine resin adhesive. In some embodiments, aqueous-based UV-curable urethane adhesives, such as melamine-urethane-formaldehyde resins, are preferred to adhere the decorative ply to the substrate. In some embodiments the adhesive is a phenol-formaldehyde resin, a water and boil proof glue that passes British Standard 6566-1985 WPB, i.e. the 72-hour boiled test samples should show 40% or higher wood failure values at the broken glue lines for at least 60% of the sample set.

The thickness of the plies is typically between about 0.03 inches to about 0.07 inches (between about 0.75 and about 1.75 mm). Thinner plies are more difficult to cut and thicker plies yield laminate that are less stable for a given thickness. To make such problems less likely, the thickness of the plies can be maintained between about 0.04 inch and about 0.063 inch (between about 1.0 mm and about 1.6 mm).

It has been found that the bottom or distal ply may be thinner than the other plies. In one embodiment, the other plies are between about 0.06 inch and about 0.063 inch (between about 1.5 mm and about 1.6 mm) and the bottom ply is about 0.04 inch (about 1 mm).

To improve dimensional stability and good bonding, the moisture content of the decorative plies, the substrate plywood laminate and the finished decorative laminate is controlled during manufacture and shipment. The moisture content is maintained between about 6% and about 8%, tested according to ASTM D4442-92. Otherwise, the wood will absorb or expel water resulting in expansion and warping.

To assist in the control of moisture content of the finished decorative laminates, the tongues and grooves are coated with a high quality water repellent, lubricating coating and the back face is coated with a sealer coat. The back face, tongues and groove may also be coated with a fungicide.

The effectiveness of the coatings is determined by measuring the average moisture content of a coated decorative plywood laminate and an uncoated decorative plywood laminate, placing them in a constant humidity chamber, exposing them to a 90% relative humidity environment at 80° F. for 7 days, and then measuring the average moisture content. The increases in the average moisture content of the coated and uncoated laminates are compared. It is desired that the increase in the average moisture content of the coated laminate be less than 20% of the increase in the average moisture content of the uncoated laminate (80% effectiveness), and preferably less than 10% (90% effectiveness).

The dimensional stability of a plywood is dependant, among other properties, on the grain direction of the plies being accurately parallel or perpendicular to the longitudinal direction of the plywood. The grain direction is identified by visual inspection. It is the direction parallel to the vessels and rays of the wood, which for most hardwoods such as lauan appear as straight, short streaks on the finished veneer surfaces. The grain direction is measured by using a ruler to draw a line parallel to the short lines, and determining how much it diverges from the edge of the plywood laminate. The grain direction is reported as a fraction, such as 1/48, i.e. there is a one inch deviation in every 48 inches of length. It is desirable to have a grain direction of 1/48 or less, preferably 1/96 or less.

Because of the dimensional stability of the substrate plywood, it can be used in another embodiment in which a melamine overlay, such as a polymer resin impregnated layer described in the Nelson et al. '668 patent, is adhered to the substrate. The melamine overlay is then printed by a direct printing method known in the art.

We claim:

1. A plywood laminate comprising a plurality of higher grade wood plies, a plurality of lower grade wood plies and an adhesive interposed between the adjacent plies adhering the plies together, the plurality of higher grade plies having a veneer grade of better than ANSI/HP VA HP-1-2000 veneer grade C and the plurality of lower grade plies having a veneer grade of no greater than ANSI/HPVA HP-1-2000 veneer grade C.

2. A plywood laminate comprising an even number of plies and an adhesive interposed between the adjacent plies adhering the plies together, the plies comprising a plurality of higher grade wood plies and a plurality of lower grade wood plies, the laminate comprising two opposed plies having an exposed major surface and at least two interior plies having no major surface exposed, the direction of the grain of adjacent plies being substantially perpendicular to each other, whereby a first plurality of plies has grain in a first direction and a second plurality of plies has grain in a second direction substantially perpendicular to the direction of the grain in the first plurality, the opposed plies being plies from the plurality of higher grade plies, and the plurality of lower grade plies including at least one interior ply from the first plurality of plies and at least one interior ply from the second plurality of plies.

3. The plywood laminate of claim 2 comprising six plies, the interior ply adjacent a first opposed ply being a ply from the plurality of lower grade plies, the next adjacent interior ply being a ply from the plurality of higher grade plies, the next adjacent interior ply being a ply from the plurality of lower grade plies, the next adjacent interior ply being a ply from the plurality of lower grade plies, and the next adjacent ply being the second opposed ply.

4. The plywood laminate of claim 3, wherein the second opposed ply has a thickness less than the thickness of the other plies.

5. The plywood laminate of claim 4, wherein the second opposed ply has a thickness approximately two-thirds of the thickness of the other substrate plies.

6. The plywood laminate of claim 2, wherein a first opposed ply has a quality less that the quality of the other plies from the plurality of higher grade plies.

7. The plywood laminate of claim 3, wherein the first opposed ply has a quality less that the quality of the other plies from the plurality of higher grade plies.

8. The plywood laminate of claim 1, wherein all of the plies are hardwoods.

9. The plywood laminate of claim 1, wherein all of the plies are of a species selected from the group consisting of meranti, lauan and combinations thereof.

10. The plywood laminate of claim 1, wherein all of the plies have a density of between about 400 kg/in$^3$ and about 600 kg/in$^3$.

11. The plywood laminate of claim 1, wherein all of the plies have moisture content at least 6% and no more than 8%.

12. The plywood laminate of claim 1, wherein the plywood laminate has a moisture barrier applied to exposed surfaces of the laminate, the moisture barrier having an effectiveness of at least 80%.

13. The plywood laminate of claim 12, wherein the moisture barrier has an effectiveness of at least 90%.

14. The plywood laminate of claim 1, wherein all of the plies have a grain direction of 1/48 or less.

15. The plywood laminate of claim 1, wherein the adhesive comprises a phenol-formaldehyde resin.

16. The plywood laminate of claim 1, wherein the adhesive comprises a melamine-urea-formaldehyde resin.

17. The plywood laminate of claim 1, wherein the total number of plies is selected from the group consisting of 4, 6 and 8.

18. The plywood laminate of claim 1, wherein all of the plies have a thickness of about 0.03 inches to about 0.07 inches.

19. A decorative plywood laminate comprising a decorative ply and a plywood substrate, the plywood substrate being the plywood laminate of claim 1.

20. The decorative plywood laminate of claim 19, wherein the decorative ply is adjacent a crossband ply of the substrate, wherein a back ply distal the decorative ply has a grain direction substantially parallel to the direction of the grain of the decorative ply, at least one inner ply has a grain direction substantially parallel to the direction of the grain of the decorative ply, and a plurality of crossband plies have a grain direction substantially perpendicular to the direction of the grain of the decorative ply.

21. The decorative plywood laminate of claim 20, wherein, the at least one inner ply is a ply from the plurality of lower grade plies, the back ply is a ply from the plurality of higher grade plies and, and the plurality of crossband plies comprises a ply from the plurality of higher grade plies and a ply from the plurality of lower grade plies.

22. The decorative plywood laminate of claim 21, wherein the crossband ply adjacent the decorative ply is a ply from the plurality of higher grade plies.

23. The decorative plywood laminate of claim 20, wherein the substrate has six plies, the crossband ply adjacent the decorative ply being a ply from the plurality of higher grade plies, the next adjacent inner ply being a ply from the plurality of lower grade plies and having grain substantially parallel to the grain of the decorative ply, the next adjacent crossband ply being a ply from the plurality of higher grade plies, the next adjacent inner ply being a ply from the plurality of lower grade plies and having grain substantially parallel to the grain of the decorative ply, the next adjacent crossband ply being a ply from the plurality of lower grade plies, and the next adjacent ply being the back ply, the back ply being a ply from the plurality of higher grade plies.

24. The decorative plywood laminate of claim 23, wherein the back ply has a thickness less than the thickness of the other substrate plies.

25. The decorative plywood laminate of claim 24, wherein the back ply has a thickness approximately two-thirds of the thickness of the other substrate plies.

26. The decorative plywood laminate of claim 22, wherein the crossband ply adjacent the decorative ply has a quality less that the quality of the other plies from the plurality of higher grade plies.

27. The decorative plywood laminate of claim 19, wherein all of the plies of the substrate are hardwoods.

28. The decorative plywood laminate of claim 19, wherein all of the plies of substrate are selected from the group consisting of meranti, lauan and combinations thereof.

29. The decorative plywood laminate of claim 19, wherein all of the plies of the substrate have a density of between about 400 kg/m$^3$ and about 600 kg/m$^3$.

30. The decorative plywood laminate of claim 19, wherein the decorative laminate has a moisture content at least 6% and no more than 8%.

31. The decorative plywood laminate of claim 19, wherein the decorative laminate has a moisture barrier applied to exposed surfaces of the decorative laminate, the moisture barrier having an effectiveness of at least 80%.

32. The decorative plywood laminate of claim 31, wherein the moisture barrier has an effectiveness of at least 90%.

33. The decorative plywood laminate of claim 19, wherein all of the plies of substrate have a grain direction of ¹⁄₄₈ or less.

34. The decorative plywood laminate of claim 19, wherein the adhesive comprises a phenol-formaldehyde resin.

35. The decorative plywood laminate of claim 19, wherein the adhesive comprises a melamine-urea-formaldehyde resin.

36. The decorative plywood laminate of claim 19, wherein the decorative ply is a hardwood.

37. The decorative plywood laminate of claim 36, wherein the hardwood is oak.

38. The decorative plywood laminate of claim 19, wherein the total number of plies is selected from the group consisting of 5, 7 and 9.

39. The decorative plywood laminate of claim 19, wherein all of the plies of the substrate have a thickness of about 0.03 inches to about 0.07 inches.

40. The decorative plywood laminate of claim 19, wherein the decorative laminate comprises a tongue and groove, the thickness of the tongue being greater than the thickness of each of the plies of the substrate.

41. The decorative plywood laminate of claim 40, wherein the tongue and groove forms a click-lock connection.

42. The decorative plywood laminate of claim 40, wherein the tongue comprises a portion of at least one ply having a higher grade.

43. The decorative plywood laminate of claim 19, wherein the decorative plywood laminate comprises a tongue and groove, the tongue having an upper surface and a lower surface spaced from the upper surface, at least one adhesive layer being interposed between the upper surface and the lower surface of the tongue.

44. The decorative plywood laminate of claim 43, wherein the tongue and groove forms a click-lock connection.

45. The decorative plywood laminate of claim 43, wherein the tongue comprises a portion of at least one ply having a higher grade.

46. A decorative plywood laminate comprising the plywood laminate of claim 1 and a decorative ply, the decorative ply comprising a polymer resin-impregnated layer and a printed pattern applied to the resin-impregnated layer.

47. A plywood laminate comprising a plurality of at least four wood plies, a first plurality of plies having a grain in a first direction and a second plurality of plies having a grain in a second direction substantially perpendicular to the direction of the grain in the first plurality, the plies having exposed major surfaces comprising plies from the first plurality of plies, the grain of the exposed plies being substantially parallel to the lengthwise edge of the ply, the wood plies comprising a plurality of higher quality plies and a plurality of lower quality plies, the exposed plies comprising plies from the plurality of higher quality plies, the ply adjacent one of the exposed plies being a lower quality ply, and the next adjacent ply being a lower quality ply.

48. The plywood laminate of claim 47, wherein the plurality of higher quality plies have a veneer grade of better than ANSI/HIP VA HP-1-2000 veneer grade C and the plurality of lower quality plies have a veneer grade of no greater than ANSI/HPVA HP-1-2000 veneer grade C.

49. The plywood laminate of claim 47, wherein the plurality of higher quality plies is formed from a hardwood and the plurality of lower quality plies are formed from plies selected from the group of a softwood and a lower quality hardwood.

50. The plywood laminate of claim 47, wherein one of the exposed plies is a decorative ply, whereby the plywood laminate is a decorative plywood laminate.

51. The decorative plywood laminate of claim 50, wherein the decorative laminate comprises a tongue and groove, the thickness of the tongue being greater than the thickness of each of the plies of the substrate.

52. The decorative plywood laminate of claim 51, wherein the tongue and groove forms a click-lock connection.

53. The decorative plywood laminate of claim 51, wherein the tongue comprises a portion of at least one ply having a higher quality.

54. The decorative plywood laminate of claim 50, wherein the decorative laminate comprises a tongue and groove, the tongue having an upper surface and a lower surface spaced from the upper surface, at least one adhesive layer being interposed between the upper surface and the lower surface of the tongue.

55. The decorative plywood laminate of claim 54, wherein the tongue comprises a portion of at least one ply having a higher quality.

56. A plywood laminate comprising two opposed wood plies and a plurality of interior wood plies interposed between the two opposed plies, the wood plies comprising a plurality of higher quality plies and at least one lower quality ply, the laminate further comprising a click-lock tongue and groove, the tongue having an upper surface and a lower surface spaced from the upper surface, at least one adhesive layer being interposed between the upper surface and the lower surface of the tongue, the tongue comprising a portion of at least one ply having a higher quality.

57. The plywood laminate of claim 54, wherein the tongue and groove forms a click-lock connection.

58. The plywood laminate of claim 56, wherein the opposed plies are plies from the plurality of higher quality plies, the plurality of interior plies comprising at least one lower quality ply and at least one higher quality ply, the tongue comprising a portion of at least one lower quality ply and a portion of at least one higher quality ply.

59. A decorative plywood laminate comprising the plywood laminate of claim 56 and a decorative ply, the decorative ply comprising a polymer resin-impregnated layer and a printed pattern applied to the resin-impregnated layer.

60. A plywood laminate comprising a plurality of plies, at least one edge configuration of the plywood laminate being selected from the group consisting of a tongue edge configuration and a groove configuration, wherein the edge configuration when mated with the edge configuration of a second plywood laminate forms a click-lock connection, the edge configuration including a projection, the thickness of the projection being greater than the thickness of each of the plies.

61. The plywood laminate of claim 60, wherein the projection is a tongue.

62. A plywood laminate comprising a plurality of plies, at least one edge configuration of the plywood laminate being selected from the group consisting of a tongue edge configuration and a groove configuration, wherein the edge configuration when mated with the edge configuration of a second plywood laminate forms a click-lock connection, the edge configuration including a projection, the projection comprising portions of at least three plies.

63. The plywood laminate of claim 62, wherein the projection is a tongue.

64. A decorative plywood laminate comprising a decorative ply and a plywood substrate, the plywood substrate being the plywood laminate of claim 2.

* * * * *

UNITED STATES PATENT AND TRADEMARK OFFICE
CERTIFICATE OF CORRECTION

PATENT NO. : 7,261,947 B2 Page 1 of 1
APPLICATION NO. : 10/727749
DATED : August 28, 2007
INVENTOR(S) : Reichwein et al.

It is certified that error appears in the above-identified patent and that said Letters Patent is hereby corrected as shown below:

Column 6
Claim 10, Line 23, in3 should be m3.
Claim 10, Line 24, in3 should be m3.

Signed and Sealed this

Fourth Day of December, 2007

JON W. DUDAS
*Director of the United States Patent and Trademark Office*

US007261947C1

(12) EX PARTE REEXAMINATION CERTIFICATE (8224th)

United States Patent
Reichwein et al.

(10) Number: US 7,261,947 C1
(45) Certificate Issued: May 10, 2011

(54) PLYWOOD LAMINATE HAVING IMPROVED DIMENSIONAL STABILITY AND RESISTANCE TO WARPING AND DELAMINATION

(75) Inventors: David P. Reichwein, Elizabethtown, PA (US); Moon Gi Kim, Starkville, MS (US); Fang Qiao, Lancaster, PA (US)

(73) Assignee: AWI Licensing Company, Wilmington, DE (US)

Reexamination Request:
No. 90/009,317, Oct. 30, 2008

Reexamination Certificate for:
Patent No.: 7,261,947
Issued: Aug. 28, 2007
Appl. No.: 10/727,749
Filed: Dec. 4, 2003

Certificate of Correction issued Dec. 4, 2007.

(51) Int. Cl.
    *B32B 5/06* (2006.01)

(52) U.S. Cl. ............... 428/537.1; 428/535; 428/528; 52/748.1

(58) Field of Classification Search .................. None
    See application file for complete search history.

(56) References Cited

U.S. PATENT DOCUMENTS

| | | | |
|---|---|---|---|
| 753,791 A | 3/1904 | Fulghum | |
| 1,124,228 A | 1/1915 | Houston | |
| 1,407,679 A | 2/1922 | Ruthrauff | |
| 1,477,813 A | 12/1923 | Daniels et al. | |
| 1,510,924 A | 10/1924 | Daniels et al. | |
| 1,516,025 A | 11/1924 | Molnar et al. | |
| 1,778,069 A | 10/1930 | Fetz | |
| 1,808,667 A | 6/1931 | Lee | |
| 1,988,201 A | 1/1935 | Hall | |
| 2,045,068 A | 6/1936 | Bruce | |
| 2,276,071 A | 3/1942 | Scull | |
| 2,430,200 A | 11/1947 | Wilson | |
| 2,740,167 A | 4/1956 | Rowley | |
| 2,862,255 A | 12/1958 | Nelson | |
| 3,387,422 A | 6/1968 | Wanzer | |
| 3,470,666 A | 10/1969 | Mod et al. | |
| 3,473,281 A | 10/1969 | Omholt | |
| 3,518,800 A | 7/1970 | Tank | |
| 3,538,665 A | 11/1970 | Gohner | |
| 4,426,820 A | 1/1984 | Terbrack et al. | 52/594 |
| 4,759,164 A | 7/1988 | Abendroth et al. | 52/403 |
| 4,769,963 A | 9/1988 | Meyerson | 52/309 |
| 4,819,932 A | 4/1989 | Trotter, Jr. | 272/3 |
| 5,016,413 A | 5/1991 | Counihan | 52/391 |
| 5,253,464 A | 10/1993 | Nilsen | 52/508 |
| 5,295,341 A | 3/1994 | Kajiwara | 52/586.2 |
| 5,343,665 A | 9/1994 | Palmersten | 52/588.1 |
| 5,540,025 A | 7/1996 | Takehara et al. | 52/403.1 |
| 5,985,398 A | 11/1999 | Bellegarde | 428/54 |
| 6,029,416 A | 2/2000 | Andersson | 52/592.1 |
| 6,332,733 B1 | 12/2001 | Hamberger et al. | 403/329 |
| 6,596,362 B1 | 7/2003 | Chung | 428/55 |
| 6,922,964 B2 | 8/2005 | Pervan | 52/551 |
| 7,137,229 B2 | 11/2006 | Pervan | 52/313 |
| 7,171,791 B2 | 2/2007 | Pervan | 52/592.1 |
| 7,386,963 B2 | 6/2008 | Pervan | 52/589.1 |
| 7,444,791 B1 | 11/2008 | Pervan | 52/590.2 |

FOREIGN PATENT DOCUMENTS

| | | |
|---|---|---|
| BE | 557844 | 6/1994 |
| CH | 562377 | 5/1975 |
| DE | 1 534 802 | 4/1970 |
| DE | 2 238 660 | 2/1974 |
| DE | 1 212 275 | 3/1975 |
| DE | 26 16 077 | 10/1977 |
| DE | 33 43 601 | 6/1985 |
| DE | 93 13 274.3 | 1/1994 |
| EP | 0 194 238 A2 | 9/1986 |
| EP | 0 196 672 | 10/1986 |
| EP | 0 244 350 A1 | 4/1987 |
| EP | 0 236 283 A2 | 9/1987 |
| EP | 0 487 925 A1 | 6/1992 |
| EP | 0 849 416 A2 | 6/1998 |
| FR | 1.480.365 | 4/1974 |
| FR | 1 293 043 | 4/1977 |
| FR | 2 697 275 | 4/1994 |
| FR | 200 17 058 U1 | 8/2001 |
| GB | 1 430 423 | 3/1976 |
| GB | 1 555 115 | 11/1979 |
| GB | 2 256 023 | 11/1992 |
| JP | 6146553 | 5/1994 |
| JP | 6320510 | 11/1994 |
| JP | 7300979 | 11/1995 |
| JP | 7310426 | 11/1995 |
| JP | 8109734 | 4/1996 |
| WO | 9313280 | 7/1993 |
| WO | WO 97/37821 | 10/1997 |
| WO | WO 97/38187 | 10/1997 |
| WO | 9966152 | 12/1999 |
| WO | WO 01/21397 A1 | 3/2001 |
| WO | WO 02/055809 A1 * | 7/2002 |
| WO | WO 02/055810 | 7/2002 |
| WO | WO 02/064910 A1 | 8/2002 |

OTHER PUBLICATIONS

Wood Handbook—Wood as an Engineering Material, Forest Products Laboratory, USDA Forest Service, (2002), pp. 195, 196, 207–237, 267, 356–358, 416, and 47.
Technical Note, Opposition EP 0.877.130, Facts–Grounds–Arguments, dated Oct. 27, 2000.
Notice of Opposition EP 0 855 482 B1, dated Jun. 28, 2000.

* cited by examiner

*Primary Examiner*—Brenda Brumback (57) ABSTRACT

A plywood laminate having dimensional stability and resistance to warping and delamination is formed from a plurality of higher quality plies and a plurality of lower quality plies. The higher quality plies may be of hardwood and the lower quality plies may be of softwood or lower quality hardwoods, or the higher quality plies may have a veneer grade of better than ANSI/HPVA HP-1-2000 veneer grade C and the lower quality plies may have a veneer grade of no greater than ANSI/HPVA HP-1-2000 veneer grade C. The exposed plies are of the higher quality. In most embodiments, at least two adjacent interior plies are of the lower quality. In those embodiments having a tongue and groove or click-lock edge configuration, the tongue comprises portions of at least two plies and at least one of the plies is a higher quality ply.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 40-41, 44, 51-52, 57, 61 and 63 are cancelled.

Claims 1, 2, 3, 5, 19, 34, 35, 42, 43, 46, 47, 53, 54, 60, 62 and 64 are determined to be patentable as amended.

Claims 4, 6-18, 20-33, 36-39, 45, 48-50, 55, 56, 58 and 59, dependent on an amended claim, are determined to be patentable.

1. A plywood laminate comprising a plurality of higher grade wood plies, a plurality of lower grade wood plies and an adhesive interposed between the adjacent plies adhering the plies together, the plurality of higher grade plies having a veneer grade of better than ANSI/HP VA HP-1-2000 veneer grade C and the plurality of lower grade plies having a veneer grade of no greater than ANSI/HPVA HP-1-2000 veneer grade C, *the plywood laminate having click-lock edge configurations consisting of a tongue and a groove, the tongue comprising at least one ply with a grain in a first direction and at least one ply with a grain in a second direction substantially perpendicular to the first direction.*

2. A plywood laminate comprising an even number of plies and an adhesive interposed between the adjacent plies adhering the plies together, the plies comprising a plurality of higher grade wood plies and a plurality of lower grade wood plies, the *plywood* laminate comprising two opposed plies having an exposed major surface and at least two interior plies having no major surface exposed, the direction of the grain of adjacent plies being substantially perpendicular to each other, whereby a first plurality of plies has grain in a first direction and a second plurality of plies has grain in a second direction substantially perpendicular to the direction of the grain in the first plurality, the opposed plies being plies from the plurality of higher grade plies, and the plurality of lower grade plies including at least one interior ply from the first plurality of plies and at least one interior ply from the second plurality of plies, *the plywood laminate having click-lock edge configurations consisting of a tongue and a groove, the tongue comprising at least one ply from the first plurality of plies having the grain in the first direction and at least one ply from the second plurality of plies having the grain in the second direction.*

3. The plywood laminate of claim 2, comprising six plies, the interior ply adjacent a first opposed ply being a ply from the plurality of lower grade plies, the next adjacent interior ply being a ply from the plurality of higher grade plies, the next adjacent interior ply being a ply from the plurality of lower grade plies, the next adjacent interior ply being a ply from the plurality of lower grade plies, and the next adjacent ply being [the] *a* second opposed ply.

5. The plywood laminate of claim 4, wherein the second opposed ply has a thickness approximately two-thirds of the thickness of the other [substrate] plies.

19. A decorative plywood laminate comprising a decorative ply and a plywood substrate, the plywood substrate being the plywood laminate of claim [1] *60*.

34. The [decorative] plywood laminate of claim [19] *2*, wherein the adhesive comprises a phenol-formaldehyde resin.

35. The [decorative] plywood laminate of claim [19] *2*, wherein the adhesive comprises a melamine-urea-formaldehyde resin.

42. The decorative plywood laminate of claim [40] *19*, wherein the tongue comprises a portion of at least one ply having a higher grade.

43. The decorative plywood laminate of claim 19, wherein [the decorative plywood laminate comprises a tongue and groove,] the tongue [having] *has* an upper surface and a lower surface spaced from the upper surface, at least one adhesive layer being interposed between the upper surface and the lower surface of the tongue.

46. A decorative plywood laminate comprising the plywood laminate of claim [1] *60* and a decorative ply, the decorative ply comprising a polymer resin-impregnated layer and a printed pattern applied to the resin-impregnated layer.

47. A plywood laminate comprising a plurality of at least [four] *five* wood plies, a first plurality of plies having a grain in a first direction and a second plurality of plies having a grain in a second direction substantially perpendicular to the direction of the grain in the first plurality, the plies having exposed major surfaces comprising plies from the first plurality of plies, the grain of the exposed plies being substantially parallel to the lengthwise edge of the ply, the wood plies comprising a plurality of higher quality plies and a plurality of lower quality plies, the exposed plies comprising plies from the plurality of higher quality plies, the ply adjacent one of the exposed plies being a lower quality ply, and the next adjacent ply being a lower quality ply, *the plywood laminate having click-lock edge configurations consisting of a tongue and a groove, the tongue comprising at least one ply from the first plurality of plies having the grain in the first direction and at least one ply from the second plurality of plies having the grain in the second direction.*

53. The decorative plywood laminate of claim [51] *50*, wherein the tongue comprises a portion of at least one ply having a higher quality.

54. The decorative plywood laminate of claim 50, wherein [the decorative laminate comprises a tongue and groove,] the tongue [having] *has* an upper surface and a lower surface spaced from the upper surface, at least one adhesive layer being interposed between the upper surface and the lower surface of the tongue.

60. A plywood laminate comprising a plurality of plies, at least one edge configuration of the plywood laminate being selected from the group consisting of a tongue edge configuration and a groove configuration, wherein the edge configuration when mated with the edge configuration of a second plywood laminate forms a click-lock connection, the edge configuration including a [projection] *tongue*, the thickness of the [projection] *tongue* being greater than the thickness of each of the plies, *and the tongue comprising at least one ply having a grain in a first direction and at least one ply having a grain in a second direction substantially perpendicular to the first direction.*

62. A plywood laminate comprising a plurality of plies, at least one edge configuration of the plywood laminate being selected from the group consisting of a tongue edge configuration and a groove configuration, wherein the edge configuration when mated with the edge configuration of a second plywood laminate forms a click-lock connection, the edge configuration including a [projection] *tongue*, the [projection] *tongue* comprising portions of at least three plies, *at least one of the three plies having a grain in a first direction and at least one of the three plies having a grain in a second direction substantially perpendicular to the first direction.*

64. A decorative plywood laminate comprising a decorative ply and a plywood substrate, the plywood substrate being the plywood laminate of claim [2] *62*.

\* \* \* \* \*